United States Patent [19]

Becher

[11] Patent Number: 6,085,105
[45] Date of Patent: Jul. 4, 2000

[54] METHOD FOR ADMINISTERING ADDITIONAL SERVICES IN A MOBILE COMMUNICATION NETWORK

[75] Inventor: Reinhard Becher, Munich, Germany

[73] Assignee: Siemens Aktiengesellschaft, Munich, Germany

[21] Appl. No.: 08/810,622

[22] Filed: Feb. 28, 1997

[30] Foreign Application Priority Data

Mar. 1, 1996 [DE] Germany .......................... 196 08 464

[51] Int. Cl.[7] .............................. H04Q 7/30; H04Q 7/32
[52] U.S. Cl. ........................ 455/517; 455/433; 455/461; 455/414
[58] Field of Search .................................. 455/433, 461, 455/414, 517

[56] References Cited

U.S. PATENT DOCUMENTS

| | | | |
|---|---|---|---|
| 5,428,665 | 6/1995 | Lantto | 455/414 |
| 5,504,804 | 4/1996 | Widmark et al. | 455/414 |
| 5,517,562 | 5/1996 | McConnell | 379/207 |
| 5,557,655 | 9/1996 | Lantto | 455/433 |
| 5,577,103 | 11/1996 | Foti | 455/412 |
| 5,592,535 | 1/1997 | Klotz | 455/406 |
| 5,613,213 | 3/1997 | Naddell et al. | 455/414 |
| 5,689,547 | 11/1997 | Molne | 379/379 |
| 5,752,188 | 5/1998 | Astrom | 455/433 |
| 5,781,858 | 7/1998 | Lantto et al. | 455/414 |

OTHER PUBLICATIONS

Jacek Biala, Mobilfunk und Intelligente Netze, Vieweg Verlag, Wiesbaden, (1995), pp. 37–58, 66–71, 146–151, 239–248, 308–309.

Peter Fregelius, Neue Dienste und Anwendungen dank Intelligentem Netz, Feb. 1992, (das technische Magazin von ASCOM) pp. 16–20.

*Primary Examiner*—William G. Trost
*Assistant Examiner*—Alan Gantt
*Attorney, Agent, or Firm*—Hill & Simpson

[57] ABSTRACT

For administering additional services, additional information about the allocation of additional services to service control units and about the status of the respective additional service are stored subscriber-associated in two memory units of the mobile communication network allocated to a subscriber. In a call setup, an interrogation of this additional information ensues. This can lead to a service request at the allocated service control unit.

5 Claims, 4 Drawing Sheets

METHOD FOR ADMINISTERING ADDITIONAL SERVICES IN A MOBILE COMMUNICATION NETWORK

BACKGROUND OF THE INVENTION

The present invention is directed to a method for administering additional services in a mobile communication network, whereby the additional services can be used according to an intelligent network structure.

Mobile communication systems such as the known GSM mobile radio network (Global System for Mobile Communication) are composed of switching equipment networked with one another to which respective base stations and, via an air interface using these base stations, communication terminal equipment can be connected. These communication terminal equipment enable network access for a subscriber of this mobile communication system. The switching equipment also effect the transition to other networks, for example data transmission networks or a fixed network.

It is also known from the GSM mobile radio network that two memory units are allocated to each subscriber in which subscriber-specific data about the intrinsic network services are respectively stored. One of these memory units realizes what is referred to as the home register that is usually located at a permanently defined place and in which the data on which the registration of the subscriber is based is stored. A second memory unit for what is referred to as the visitor register is allocated to the momentary location of the mobile subscriber. The memory unit for the visitor register in which the data specific to a subscriber are located also changes dependent on the location of the mobile subscriber.

The additional services affected by the present invention should be realized according to an intelligent network topology by independent service control units. These service control units and the profiles of the additional services, including the information necessary for their realization, deposited therein can thus be modified independently of the mobile communication network. It is known from J. Biala, "Mobilfunk und Intelligente Netze", Vieweg Verlag, Wiesbaden, 1995, pp. 37/8, 66–71, 146–151, 239–248, 308–309, that the services usable in an intelligent network are initiated in a service switching unit in order to effect an abort from the standard call processing and, thus, activate an access to additional services. Such service switching units are usually realized in the switching equipment.

It is known from the aforementioned patent application to initiate the utilization of additional services in that an active input of a call number determined for this service ensues on the part of the respective subscriber. The call number is interpreted in the switching equipment, and the call is forwarded to the respective service control unit for the conversion. This, however, means additional outlay for the subscriber.

It is also known to provide a service identifier as subscriber-associated subscriber data in the respective subscriber database, and to trigger a branch to a service control unit indicated in a subscriber database of the intelligent network by interpreting this service identifier during the call handling given an incoming or outgoing call. In this solution, the additional services can be accessed by the user without the user having to explicitly initiate this by indicating a specific call number. A distinction between the additional services, however, is not possible therewith since a maximum of one service identifier is contained in the visitor register, which controls the additional services for the calls outgoing from the user, and in the home register, which controls the calls incoming for the user. The flexibility in the design and utilization of additional services is thus greatly restricted.

SUMMARY OF THE INVENTION

It is an object of the present invention to simplify the administration of additional services for a mobile communication network and to make it more flexible.

For administration of additional services, additional information about the allocation of additional services to respective service control units and the status of the respective additional service are stored in subscriber-specific fashion in at least two memory units that can be allocated to a subscriber. These additional information are automatically interrogated in a call setup and, if an additional service is allocated, a service request is triggered to the allocated service control unit.

A greater variety of additional services that can be respectively allocated to a user is possible with such a storing and administration since different service providers and different service control units can be distinguished. In a call setup of a subscriber, these additional services can be respectively automatically called by corresponding control events in a service switching unit of the switching equipment. In that the same information is respectively available in at least two memory units, for example the home register and the visitor register, an equivalent processing of outgoing and incoming calls is possible with respect to the additional services. It is likewise possible for a subscriber to configure the totality of additional services using the additional information, that is, to potentially undertake modifications thereof.

It is provided according to an advantageous development of this solution principle that the storing of the current additional information in both memory units is undertaken for every re-allocation of a memory unit to a subscriber and every modification of additional information. This measure, which occurs without active influencing of the user, assures that the additional information in both memory units correspond, and, thus, the information relating to additional services can be modified in the same fashion for outgoing and incoming calls.

The additional information about the allocation of additional services to service control units and about the status of the respective additional service thereby advantageously contain the following:

particulars about the activatability or, respectively, modifiability of the respective additional service;

particulars about the type of respective additional service, that is, whether it is provided for incoming or outgoing calls and at which switching equipment the additional service should be processed;

particulars about a communication-network-specific address of the respective service control unit;

particulars about service key of the respective additional service that is specific to a service control unit; or particulars about the identity of the operator offering the respective additional service.

These particulars are respectively envisioned as options and need not be present in totality. However, each of these particulars expands the functionality of the additional information and expands the flexibility of the administration of the additional services.

Particulars about the activatability of an additional service allow the service provider (operator) to block the modification or, respectively, activation/deactivation of the additional service for the subscriber. A misuse of an additional service to the detriment of the service provider can thus be prevented. It can thereby also be taken into account that an activation/deactivation or, respectively, modification is only possible under certain conditions that the subscriber must meet.

The particular about the type of additional service references the fact whether the additional service is provided for an outgoing or an incoming call. The additional services can thus be classified according to the switching equipment that can request these services during the course of a call setup.

When particulars about a communication-network-specific address of the respective service control unit offering the additional service is contained (for example, an E.164 address in the GSM mobile radio system), a distinction can be made between a plurality of service control units offering the same service. A further conversion of a designation of the service to an address of the service control unit can be eliminated.

The service key specific to a service control unit serves for distinguishing between various additional services within a service control unit. As a result thereof, it becomes possible to realize various services on a service control unit, potentially even additional services of different service providers, and to make it possible for the user to distinguish between them.

Particulars about the identity of the operators also serve for distinguishing between the service providers (operators) offering the additional services. These particulars can be utilized in billings and in the selection of identical additional services of different operators.

Advantageously, an activation character can also be provided for the totality of additional services of a subscriber. This activation character is interrogated in a call setup. If no additional service is to be available for the subscriber, then, upon interrogation of the activation character, no further measures needed for an activation of an additional service need be undertaken, and the call setup is continued uninfluenced. When, however, the activation character indicates the presence of an available, additional service, the interrogation and, potentially, utilization of an additional service is initiated, for example, by the service switching unit of a switching equipment.

The memory means for realizing the home and the visitor register and for the acceptance of the additional information can be viewed as an independent unit or can be realized in a switching equipment. For the administration of additional services, however, a switching equipment must assure the transmission of the additional information between the memory units. According to one embodiment, this occurs within a message for subscriber data entry as standardized, for example, for the GSM mobile radio system.

An advantageous possibility for transmitting modify information for the additional information to the memory units or, respectively, between the memory units is within unstructured additional service data (unstructured supplementary data). This has the advantage of introducing no additional transmission formats that have not yet been standardized but instead having recourse to existing protocols (for example, known from the GSM mobile system). radio The switching equipment thereby provides that no inquiry be implemented at the respective service control unit when deactivated additional services are identified, but that every inquiry at the service control unit be suppressed due to the direct activation interrogation of the additional information that is now possible.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
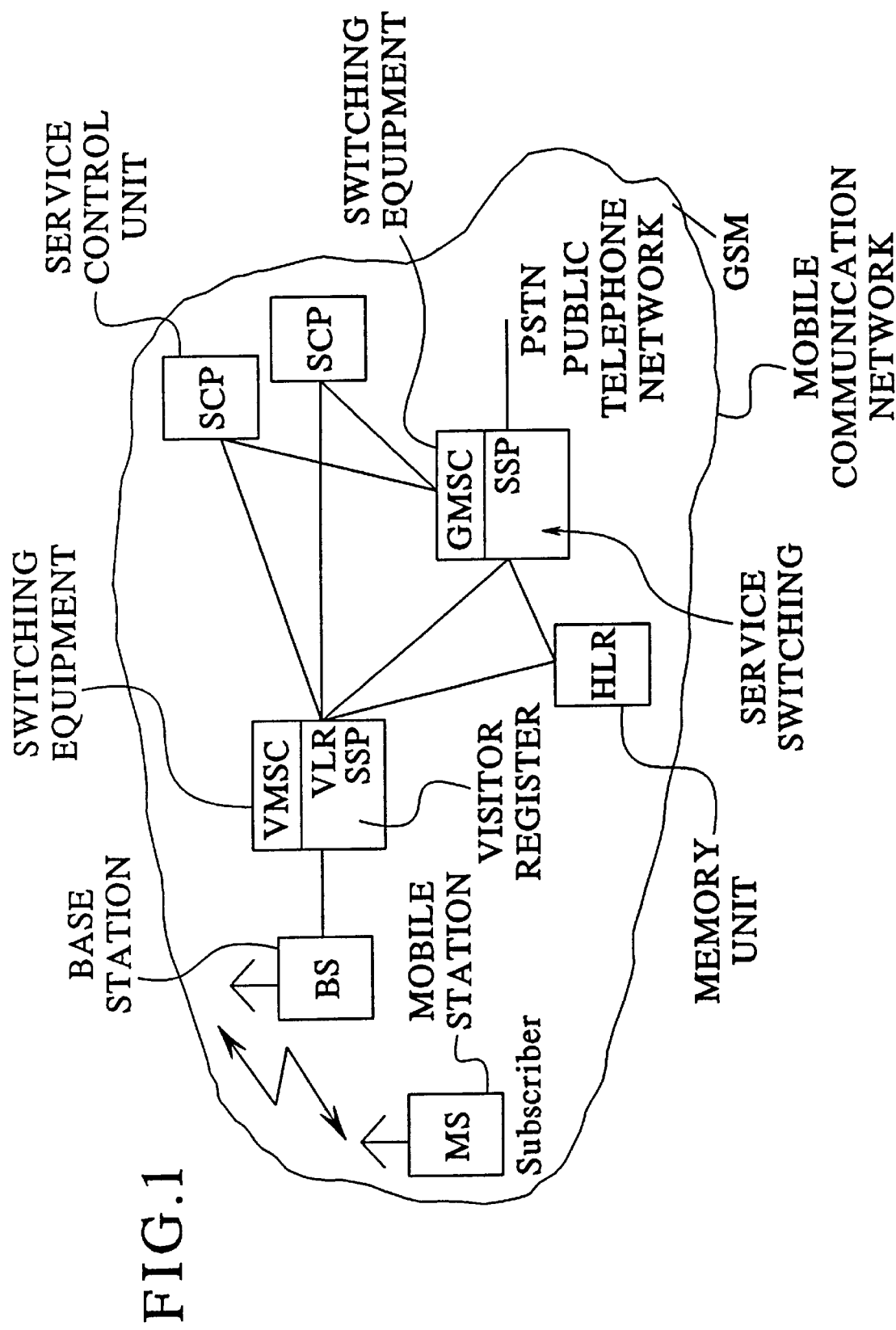
FIG. 1 depicts a mobile radiotelephone system.

The mobile communication network GSM of FIG. 1 is fashioned, for example, as a GSM mobile radiotelephone network. It contains switching equipment means VMSC, GMSC that are connected to one another. One switching equipment VMSC produces the connection to a mobile subscriber via a base station BS that is connected wirebound to the switching equipment VMSC and via an air interface between base station BS and a mobile station MS. The mobile station MS is the communication terminal equipment of the mobile subscriber.

A further switching equipment GMSC forms the network transition into a further network, for example a public switched telephone network PSTN. Further, the mobile communication network GSM contains service control units SCP that are respectively connected to at least one switching equipment VMSC, GMSC. In these connections, it is not necessary that each service control unit SCP is directly connected to each switching equipment VMSC, GMSC. It is sufficient that these can be reached via the communication network GSM. According to FIG. 1, a memory unit HLR, as home register of the mobile subscriber, is an independent unit that is connected to both switching equipment means VMSC, GMSC, for example. Both switching equipment means VMSC, GMSC contain a service switching unit SSP as sub-system. The switching equipment VMSC of the connection of the mobile subscriber also contains a visitor register VLR as long as the mobile subscriber is located in the coverage area of this switching equipment VMSC.

Connection setup messages outgoing from the mobile subscriber are processed first in the switching equipment VMSC in whose coverage area the mobile subscriber is located. The interrogation of additional services SS is to be initiated thereat. It is assumed by way of example here for calls incoming to the mobile subscriber that these reach the switching equipment GMSC of the network transition from the public switched telephone network PSTN, must be processed in this switching equipment GMSC of the network transition, and that the additional services SS available within the mobile radiotelephone network are requested thereat. The administration and seizing of additional services SS shall be explained with reference to FIGS. 2–6.

Figure 2:
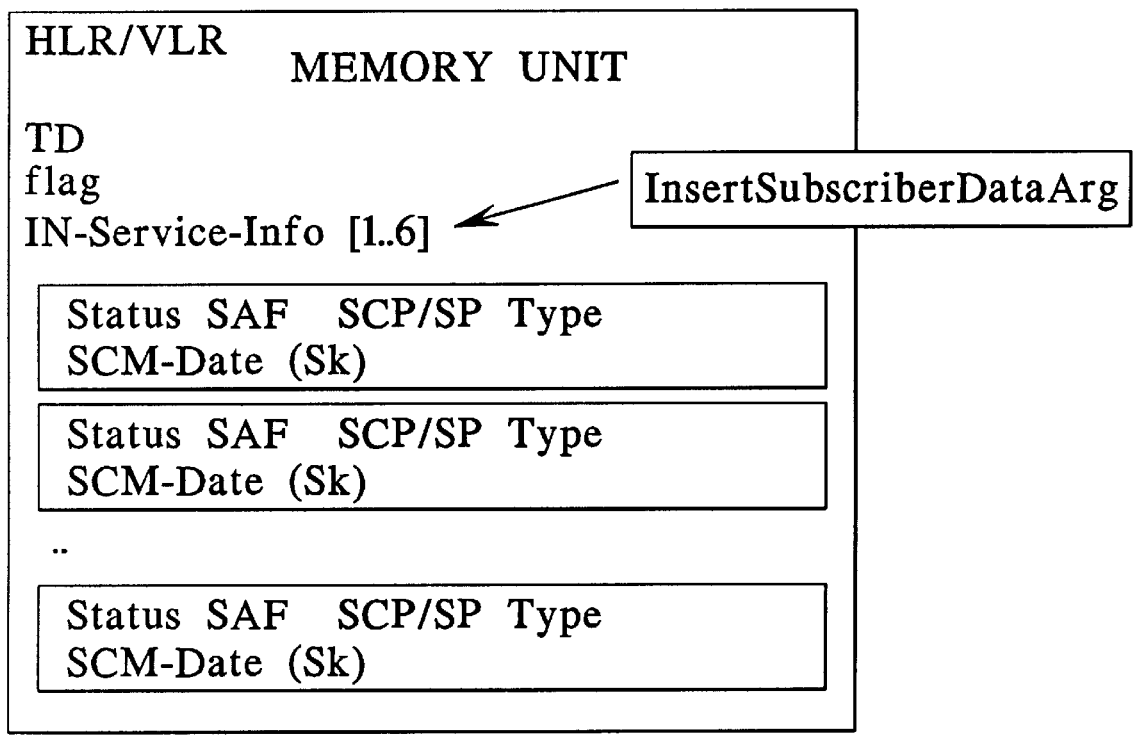
FIG. 2 depicts a memory unit with additional information contained about additional services.

A memory unit HLR, VLR of FIG. 2 represents the home register HLR or, respectively, the visitor register VLR of the mobile communication system GSM. This memory unit HLR, VLR contains additional information IN-Service-Info about additional services SS corresponding to an intelligent network. These additional information In-Service-Info are thereby allocated to a subscriber, for example in table form, in addition to subscriber data TD of a subscriber. The additional information IN-Service-Info can contain particulars about a plurality of additional services SS. For example, the maximum number of 6 additional services SS is assumed in FIG. 2.

Particulars about the status of the additional service (status), that is, as to whether this service is activated or deactivated, particulars SAF about an activatability of the respective additional service SS by the subscriber, particulars SCP/SP about the identity of the service provider offering the respective additional service SS or, respectively, the identity of the service control unit SCP, the type of additional service SS and further particulars about the additional service SS, for example a communication-network-specific address SCM-data of the service control unit SCP and a service key SK specifically associated to a service control unit are contained per additional service.

The information regarding a subscriber also contain an activation character FLAG that can be subsequently interrogated to determine if one of the additional services SS is activated. When no additional services SS at all are available to the subscriber, then no further search within the additional information IN-Service-Info need occur after interrogation of this activation character FLAG. When, however, the activation character FLAG indicates activated additional services SS, then the additional information IN-Service-Info must be taken into consideration in the connection setup.

A message regarding the subscriber data entry InsertSubscriberDataArg serves for storing the additional information IN-Service-Info in the memory units HLR, VLR. This message is exchanged when the subscriber undertakes changes in the additional information IN-Service-Info. This message for subscriber data entry InsertSubscriberDataArg that is provided for the basic services within the GSM mobile radiotelephone system can also be advantageously used here for the additional services SS.

Figure 3:
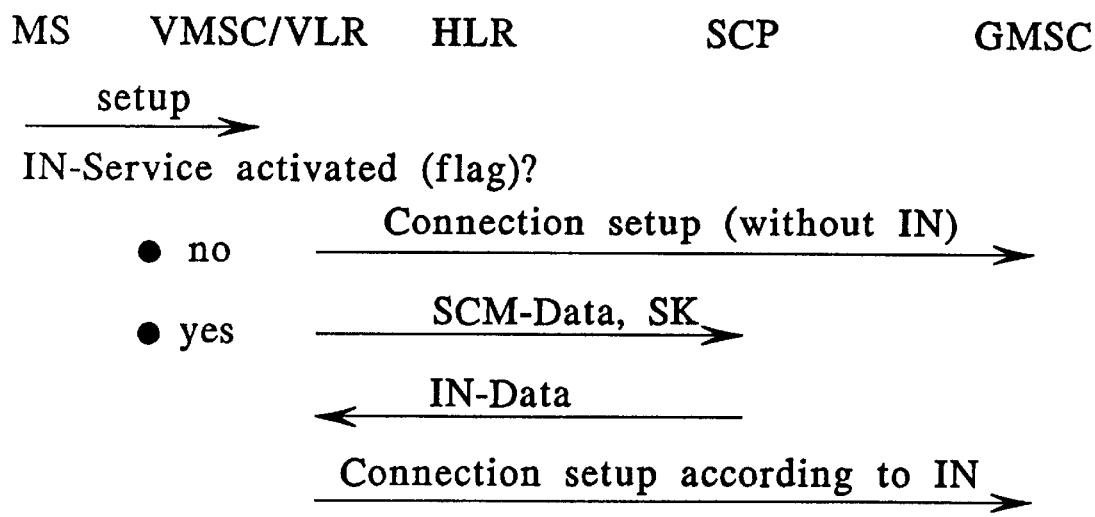
FIG. 3 depicts the interrogation or, respectively, seizing of additional services in a call setup outgoing from a mobile subscriber.

In the call setup according to FIG. 3, this proceeds from the mobile subscriber via the mobile station MS (communication terminal equipment). The call setup message SETUP reaches the switching equipment VMSC/VLR in whose coverage area the mobile station MS is located. In response thereto, the visitor register FLR in the switching equipment VMSC is interrogated, for example on the basis of the activation character FLAG, as to whether additional services SS are activated. When this is not the case, the call setup ensues without requiring additional services SS.

When additional services SS are activated, then the particulars that are required for designating the service control unit SCP for the additional service SS are interrogated from the additional information IN-Service-Info of the visitor register VLR with respect to the calling subscriber. Given a plurality of competing additional services SS, a prioritization is to be provided within the additional information IN-Service-Info, for example with reference to a price comparison or the point in time of the activation.

The switching equipment VMSC initiates a signalling to the service control unit SCP that offers the additional service SS. The service control unit SCP takes particulars (for example, the service key Sk) about the desired additional service SS from this signalling and returns the data (IN-data) needed to assure the additional service to the switching equipment VMSC. A call setup that takes the additional service SS into account subsequently occurs using this data about the additional service SS.

Figure 4:
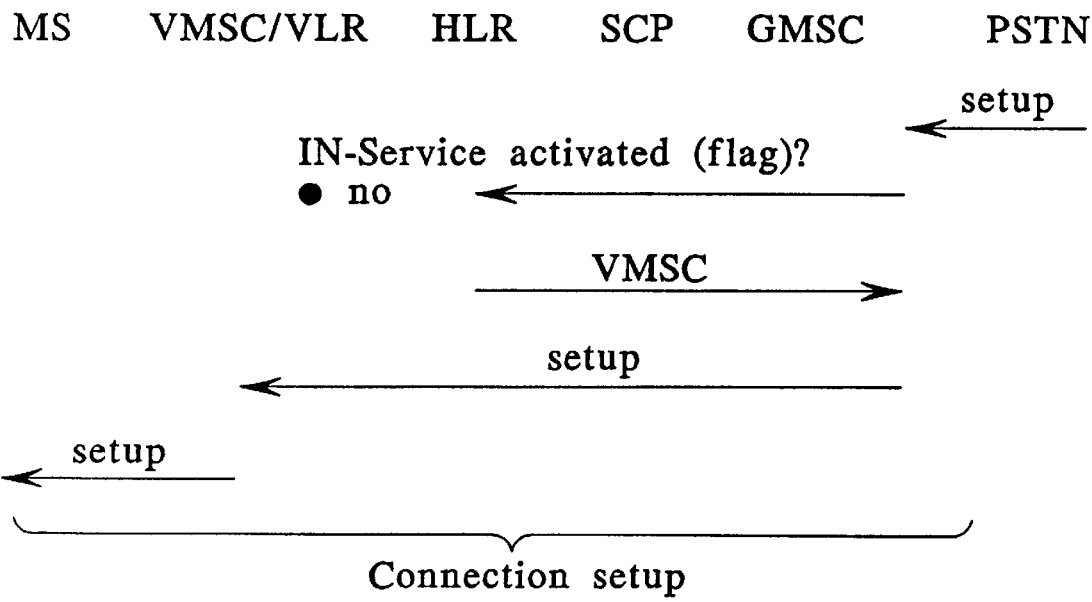
FIGS. 4–5 depict the interrogation or, respectively, seizing of additional services in a call setup incoming for a mobile subscriber.
Figure 5:
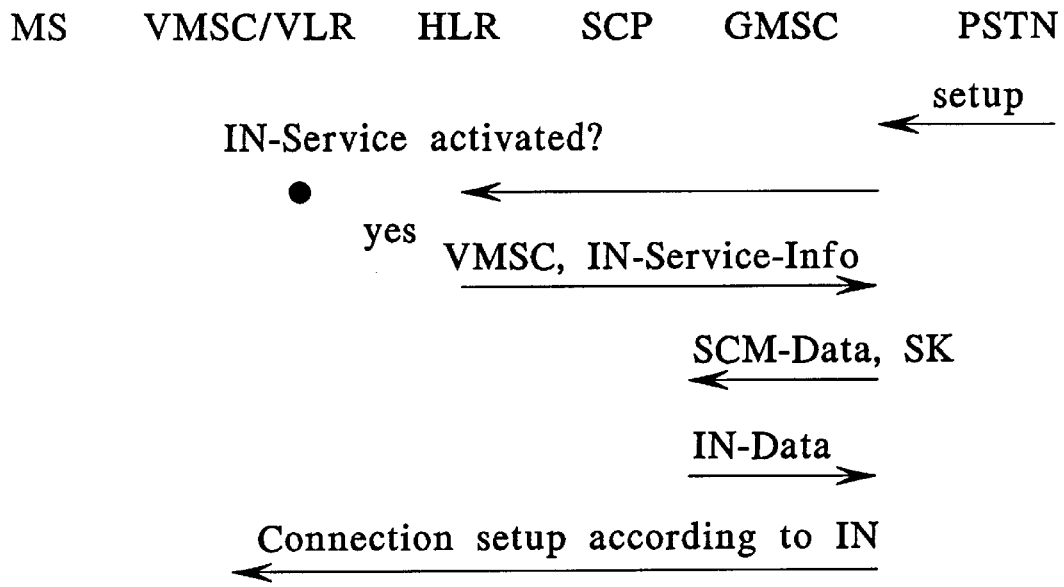

FIGS. 4 and 5 show calls incoming for the mobile subscriber. A connection setup message SETUP from the public switched telephone network PSTN reaches the switching equipment GMSC that assures the network transition. An inquiry with respect to the mobile subscriber in his home register HLR occurs proceeding from this switching equipment GMSC. A determination is made thereat as to whether additional services SS are activated. When this is not the case, then the connection setup is continued according to FIG. 4. When it is the case, then this occurs according to FIG. 5.

When no additional service SS is activated, the home register HLR merely communicates the address of the switching equipment VMSC via which the mobile subscriber can be reached to the switching equipment GMSC of the network transition. Subsequently, the switching equipment GMSC of the network transition continues the connection setup to the mobile subscriber without laying claim to additional services SS.

When, however, additional services SS are activated, not only the address of the switching equipment VMSC for the mobile subscriber but additional information IN-Service-Info about the additional services as well are communicated from the home register HLR to the switching equipment GMSC of the network transition. The switching equipment GMSC of the network transition now asks for further information about the additional service SS from the allocated service control unit SCP. After receiving the further information about the additional service SS, the switching equipment GMSC can now continue the connection setup according to the additional service SS.

Figure 6:
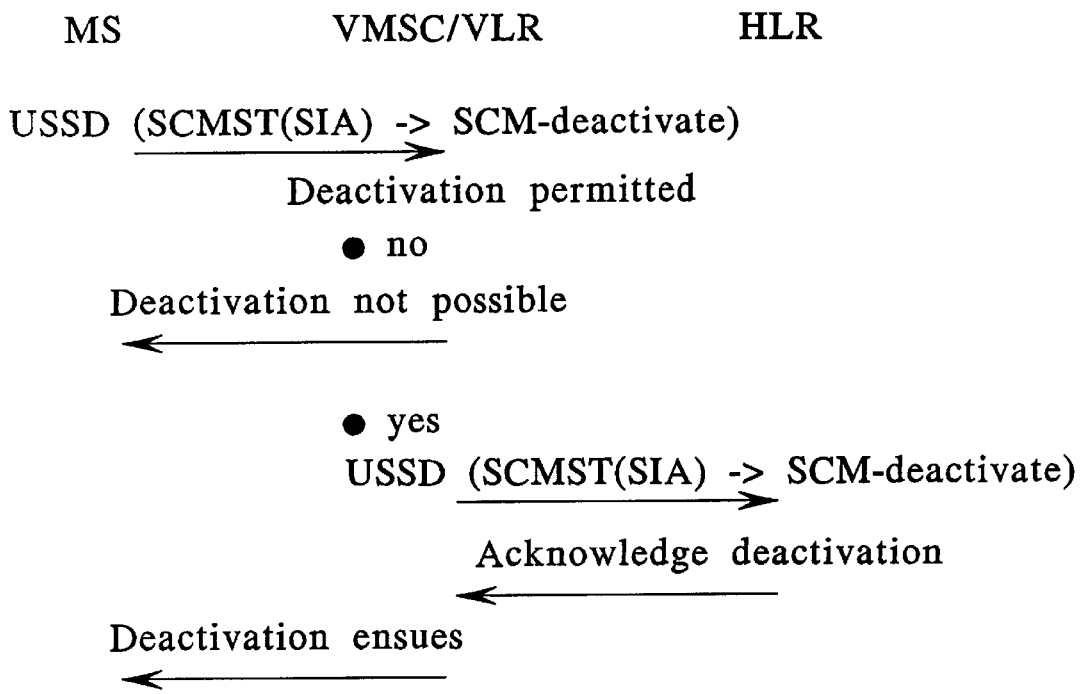
FIG. 6 depicts the modifiability of the profile of additional services for a subscriber with reference to the example of deactivation.

For activation/deactivation or, respectively, modification of additional information IN-Service-Info about additional services SS, the mobile subscriber communicates modify information SCMST within unstructured auxiliary service data USSD to the closest switching equipment VMSC via the communication terminal equipment MS (see FIG. 6). In the switching equipment VMSC, an inquiry is made in the visitor register VLR as to whether these modifications are allowed. When this is not the case, then an answer back occurs to the mobile subscriber that this deactivation (as an example of a modify inquiry) is not possible. When the deactivation of an additional service is allowed, then this occurs in the visitor register VLR, and, over and above this, the modify information SCMST is communicated to the home register HLR of the mobile subscriber in a further message from the visitor register VLR within unstructured auxiliary service data USSD. This deactivation then also ensues thereat, this being acknowledged and confirmed to the mobile subscriber via the switching equipment VMSC.

In, for example, a service identification part SIA, the modify information SCMST within unstructured auxiliary service data USSD contain particulars about the identity of the service provider SCP/SP, so additional services SS of individual service providers can also be separately modified.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for administering additional services in a mobile communication network having networked switching equipment device to which communication terminal equipment that enable subscriber access are connectible via further devices and/or via which the transitions to further networks can be effected, having at least one service control unit that controls a respective additional service, and having at least two memory units for subscriber-specific data, comprising the steps of:

storing additional information about allocation of additional services to respective service control units and storing status of a present respective additional service in subscriber-specific fashion in the at least two memory units allocated to a subscriber;

generating an image of current additional information in the at least two memory units for every re-allocation of a memory unit of the at least two memory units to a subscriber and/or for every modification of additional information; and selecting one of a plurality of service providers by offering the respective additional service, by evaluating an identity of a service provider within unstructured additional service data, and by addressing a dataset of the additional information that selects the service provider.

2. The method according to claim 1, wherein the identity of the service provider is communicated in a service identification part of the unstructured additional service data.

3. A method for administering additional services in a mobile communication intelligent network having networked switching equipment device to which communication terminal equipment that enable subscriber access are connectible via further devices and/or via which the transitions to further networks can be effected, having at least two service control units that control a respective additional service, and having at least two memory units for subscriber-specific data, comprising the steps of:

storing additional information about allocation of additional services to respective service control units and storing status of a present respective additional service in subscriber-specific fashion in the at least two memory units allocated to a subscriber;

transmitting modify information, pertaining to the additional information, within unstructured additional service data from the communication terminal equipment to the at least two memory units and/or between the at least two memory units; and generating an image of current additional information in the at least two memory units for every re-allocation of a memory unit of the at least two memory units to a subscriber and for every modification of additional information;

providing a subscriber-associated activation character that is interrogated given a call setup in the memory unit of the at least two memory units for the totality of additional services; and using the additional information in a call setup dependent on a comparison result, at least one of the additional information and the activation character being modifiable by a subscriber via the communication terminal equipment insofar as no block is provided therefor.

4. A method for administering additional services in a mobile communication intelligent network having networked switching equipment device to which communication terminal equipment that enable subscriber access are connectible via further devices and/or via which the transitions to further networks can be effected, having at least two service control units that control a respective additional service, and having at least two memory units for subscriber-specific data, comprising the steps of:

storing additional information about allocation of additional services to respective service control units and storing status of a present respective additional service in subscriber-specific fashion in the at least two memory units allocated to a subscriber;

transmitting modify information, pertaining to the additional information, within unstructured additional service data from the communication terminal equipment to the at least two memory units and/or between the at least two memory units; and generating an image of current additional information in the at least two memory units for every re-allocation of a memory unit of the at least two memory units to a subscriber and for every modification of additional information;

offering, for selecting one of a plurality of service providers, the respective additional service;

evaluating an identity of a service provider within unstructured additional service data; and addressing a dataset of the additional information that selects the service provider.

5. The method according to claim 4, wherein the identity of the service provider is communicated in a service identification part of the unstructured additional service data.

* * * * *